(12) United States Patent
Yu

(10) Patent No.: US 7,199,854 B2
(45) Date of Patent: Apr. 3, 2007

(54) GROUNDING APPARATUS OF PRINT CIRCUIT BOARD IN A LIQUID CRYSTAL DISPLAY

(75) Inventor: Tsung-Hsi Yu, Yuan Ho (TW)

(73) Assignee: AU Optronics Corp., Hsinchu (TW)

( * ) Notice: Subject to any disclaimer, the term of this patent is extended or adjusted under 35 U.S.C. 154(b) by 0 days.

(21) Appl. No.: 10/790,812

(22) Filed: Mar. 3, 2004

(65) Prior Publication Data
US 2005/0083447 A1  Apr. 21, 2005

(30) Foreign Application Priority Data
Oct. 17, 2003  (TW) .............................. 92128857 A

(51) Int. Cl.
*G02F 1/1345* (2006.01)
(52) U.S. Cl. .................. 349/149; 349/58; 349/150; 349/151; 349/152
(58) Field of Classification Search ............ 349/58–60, 349/149–152; 361/681, 752; 345/905
See application file for complete search history.

(56) References Cited

U.S. PATENT DOCUMENTS

| | | | |
|---|---|---|---|
| 6,411,353 B1 * | 6/2002 | Yarita et al. .................. | 349/59 |
| 6,855,441 B1 * | 2/2005 | Levanon ........................ | 429/7 |
| 2002/0097353 A1 * | 7/2002 | Lee ............................. | 349/58 |
| 2004/0160546 A1 * | 8/2004 | Huang et al. ................. | 349/58 |

* cited by examiner

*Primary Examiner*—David Nelms
*Assistant Examiner*—Thanh-Nhan Phan Nguyen
(74) *Attorney, Agent, or Firm*—Troxell Law Office PLLC

(57) ABSTRACT

A liquid crystal display (LCD) has a plastic frame for supporting a liquid crystal display panel and a metal cover for boxing the plastic frame. A print circuit board (PCB) is fixed on a lower surface of the plastic frame and connects to the liquid crystal display panel by using a flexible flat cable that extends along a sidewall of the plastic frame. A conductive film is taped both on a grounding pin of the PCB and on a sidewall of the metal cover for discharging segregated charges on the PCB to the environment.

19 Claims, 4 Drawing Sheets

GROUNDING APPARATUS OF PRINT CIRCUIT BOARD IN A LIQUID CRYSTAL DISPLAY

BACKGROUND OF THE INVENTION (1) Field of the Invention

This invention relates to an apparatus utilized for grounding a print circuit board of a liquid crystal display, and more particularly to an apparatus for forming an electric connection between the print circuit board and the metal box of the liquid crystal display.

(2) Description of Related Art

Along with enormous promotions of thin film transistor (TFT) fabrication technique, liquid crystal displays (LCD) are broadly adopted to personal digital assistants (PDA), notebooks (NB), digital cameras (DC), digital videos (DV), mobile phones, etc. Typically, a cold cathode fluorescent lamp (CCFL) is inserted into the LCD as a backlight source. A liquid crystal (LC) driving circuit is used to decode input signals for forming displaying data and scanning sequence data to further control the image of the LCD.

Ordinarily, in order to increase a display size of the LCD and to simplify the LCD fabrication sequence, the LC driving circuit is usually formed on a print circuit board (PCB) instead of formed traditionally on a glass substrate, accompanied by devices such as tape automated bounding (TAB), chip on glass (COG), chip on film (COF), etc. The PCB having the LC driving circuit is thus able to issue controlling signals to the LCD panel through a flexible flat cable (FFC).

Because environmental noises may disturb the LC driving circuit by messing the formation of the controlling signals, a proper electric shielding is usually introduced to the PCB so as to remove the charges left on the PCB during LC driving circuit operation. Definitely, upon such an arrangement, a specific grounding apparatus should be added on the PCB.

In FIG. 1, a typical LCD 10 comprises a metal cover 100, a plastic frame 200, an LCD panel 300, and a PCB 400. The LCD panel 300 and the PCB 400 are fixed on the opposite surfaces of the plastic frame 200 with an inter-connected FFC 410. The metal cover 100 boxes the plastic frame 200 therein to form an interior space for accommodating the LCD panel 300.

In order to prevent a particular electric current in the LC driving circuit from being disturbed by segregated charges on the PCB 400, as shown in FIG. 2, the PCB 400 has two grounding pins 430 formed on both edges 400b adjacent to sidewalls of the metal cover 100b for removing the segregated charges. Also referring to FIG. 1, each grounding pin 430 is fastened to the plastic frame 200 by using a PCB screw 435 and also electrically connected to the metal cover 100 by using an elastic conductive plate 440, which is fastened to the sidewall of the metal cover 100b by sending a grounding screw (not shown in this figure) into a hole 460 on the metal cover 100.

As mentioned, the grounding pin 430, the elastic conductive plate 440, the PCB screw 435, and the grounding screw are all used to achieve the purpose for grounding the PCB 400 in the art. Yet, with all these parts for grounding the PCB 400, a significant increase of time and labor on assembling an LCD is inevitable. In addition, while in screwing the PCB 400, the power to drive each screw should be carefully controlled so that screws as the fasten device won't damage the PCB 400 or the metal cover 100. Ordinarily, in order to control the screw driving power within a safety range, a power testing apparatus is also used in the assembling process to assure the process reliability.

Therefore, an improvement of a grounding apparatus targeting to minimize the number of elements and the assembling time without sacrificing the grounding effect is definitely welcome to the skilled persons in the art.

SUMMARY OF THE INVENTION

Accordingly, it is a primary object of the present invention to simplify a grounding apparatus used for grounding a PCB of an LCD, which can also save the time needed to assemble the grounding apparatus.

An LCD of the present invention comprises an LCD panel, a plastic frame, a metal cover, a PCB, and a conductive film. The plastic frame is used to settle the LCD panel. The metal cover boxes the plastic frame and the LCD panel therein. The PCB is fixed on a lower surface of the plastic frame and connects to the LCD panel by using an FFC extending along a sidewall of the plastic frame. The conductive film taped on a grounding pin of the PCB and a sidewall of the metal cover is used to discharge the segregated charges on the PCB, through the metal cover, to the environment.

Reference will now be made in detail to the preferred embodiments of the present invention, examples of which are illustrated in the accompanying drawings. Wherever possible, the same reference numbers will be used throughout the drawings to refer to the same or like parts.

BRIEF DESCRIPTION OF THE DRAWINGS

The present invention will now be specified with reference to its preferred embodiment illustrated in the drawings, in which.

DETAIL DESCRIPTION OF THE PREFERRED EMBODIMENTS

The invention disclosed herein is directed to a grounding apparatus of a PCB in an LCD. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 3A:
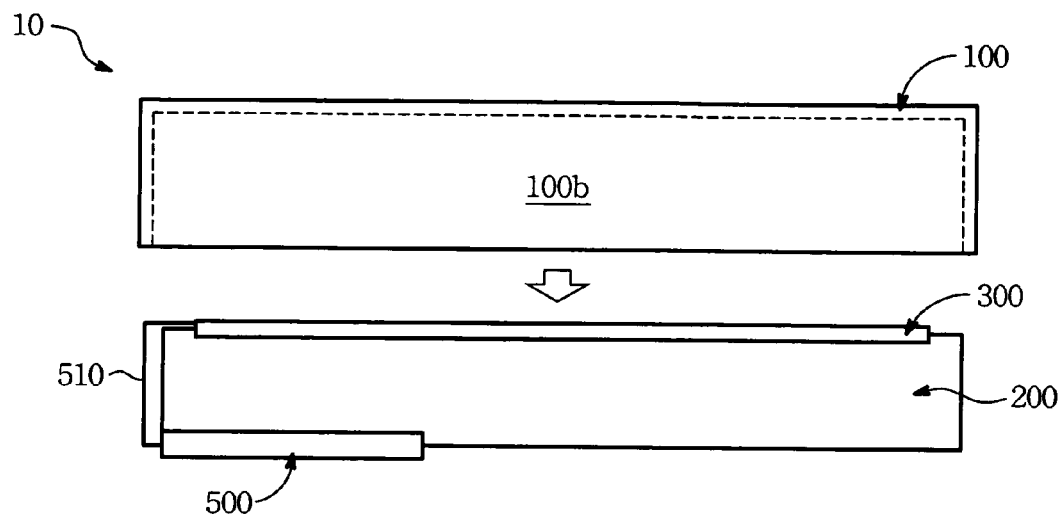
FIG. 3A depicts a schematic view of a first embodiment of the LCD in accordance with the present invention.

In a first embodiment according to the present invention as shown in FIG. 3A, an LCD 10 comprises an LCD panel 300, a plastic frame 200, a metal cover 100, and a PCB 500. The LCD panel 300 is placed on the plastic frame 200. The metal cover 100 for boxing the plastic frame 200 forms an interior space 100b to accommodate both the LCD panel 300 and the plastic frame 200. The PCB 500 is fixed on a lower surface of the plastic frame 200 and connects to the LCD panel 300 by using a flexible flat cable 510 of a proper connecting device (not shown in this figure) to input displaying controlling signals, in which the connecting device can be a tape automated bounding (TAB), a chip on glass (COG), a chip on film (COF), or the like.

Figure 3B:
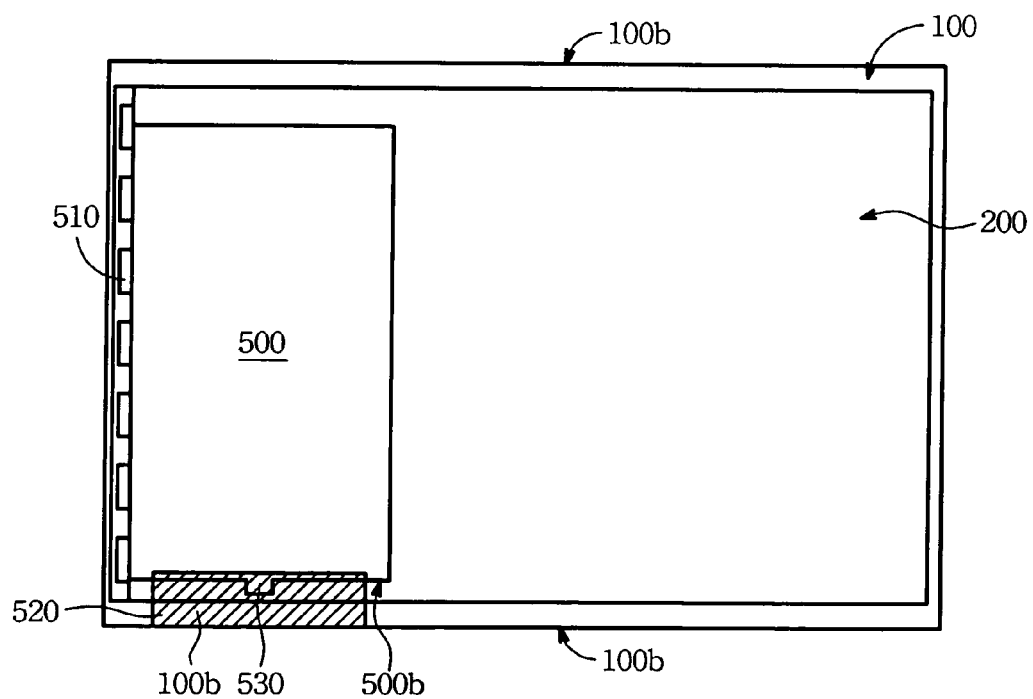
FIG. 3B depicts a bottom view of the LCD of FIG. 3A.

Also referring to FIG. 3B, a bottom view of the LCD 10 of FIG. 3A is shown, in which a grounding pin 530 is extended from a blank edge of the PCB 500b (i.e., the side without connecting flexible flat cables 510). A conductive film 520 is taped to the grounding pin 530 and a portion of the nearby metal frame 100b, such that an electrical transmission path can be established to transport segregated charges on the PCB 500 to the environment. A surface area of the conductive film 520 is smaller than that of the PCB 500. Furthermore, the conductive film 520 can also be attached on the plastic frame 200 to fix the PCB 500.

Particularly, a conductive glue, such as a silver glue, can be coated onto the conductive film 520 so as to have the conductive film 520 firmly hold the grounding pin 530, the adjacent plastic frame 200, and the sidewall of the metal cover 100b. However, in a further simplification of assembly steps that can waive the above-described glue-coating step, a conductive tape (not shown) can be directly used to paste itself on the grounding pin 530, the plastic frame 200, and the sidewall of the metal cover 100b.

Figure 4A:
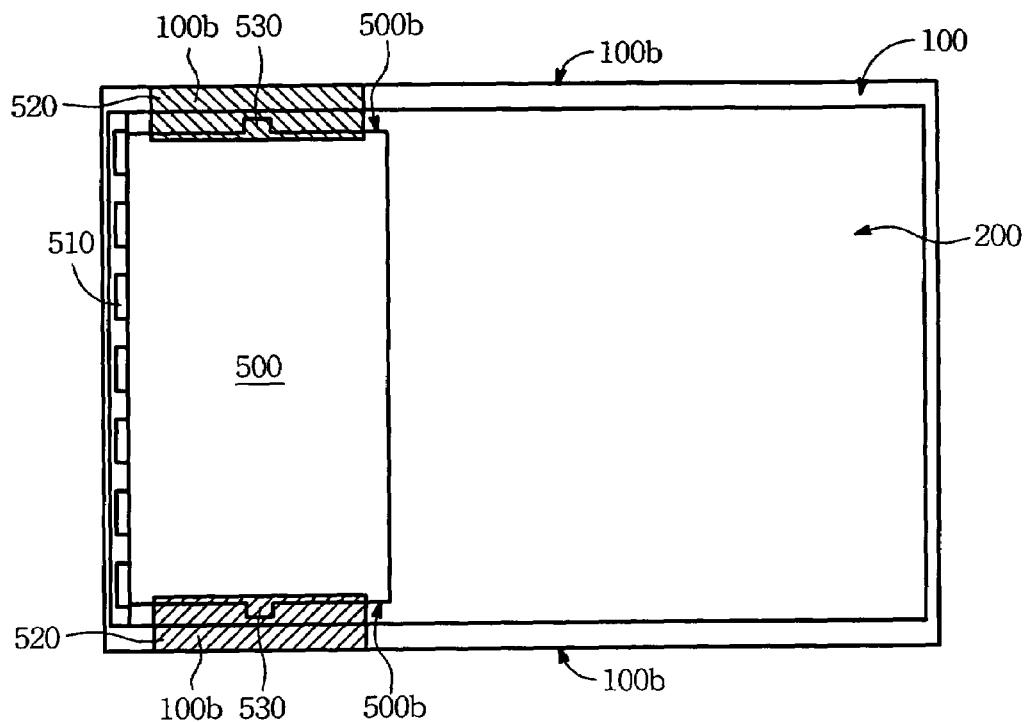
FIG. 4A depicts a bottom view of a second embodiment of the LCD in accordance with the present invention.

In the foregoing embodiment of FIG. 3B, only one grounding pin 530 is used. However, to achieve a better charge-removing efficiency, a second embodiment having two grounding pins 530 formed on the PCB 500 is shown in FIG. 4A. The two grounding pins 530 are extended from opposite blank edges of the PCB 500b without connecting flexible flat cables 510, and each of the conductive films 520 are taped respectively on the grounding pin 530, the adjacent plastic frame 200, and the nearby sidewall of the metal cover 100b. It is noted that a sum of the surface area of the two conductive films 520 is smaller than that of the PCB 500.

Figure 4B:
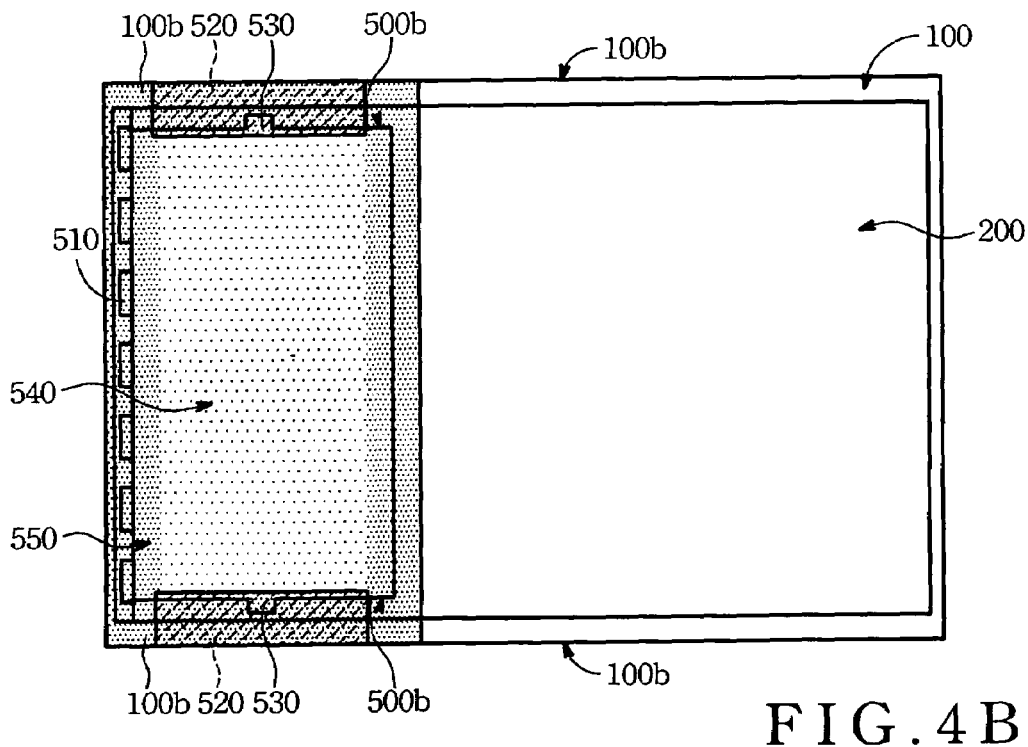
FIG. 4B shows the LCD of FIG. 4A further having a passivation film taped thereon.

In addition, to shield the circuit devices on the PCB 500 from being disturbed by environmental electrical noises, a passivation film 540 as shown in FIG. 4B is formed on an exposed lower surface of the PCB 500. It should be noted that the passivation film 540 also covers both the conductive film 520 and the flexible flat cable 510 so as to achieve a perfect electric shielding effect.

In order to attach the passivation film 540 on the PCB 500, as shown in FIG. 4B, a simple way is to coat glue onto a lower surface of the conductive film 520 and the edges of the PCB 500b before the passivation film 540 is pasted thereon. It is also noted that the glue used is not restricted to the conductive glue.

Figure 4C:
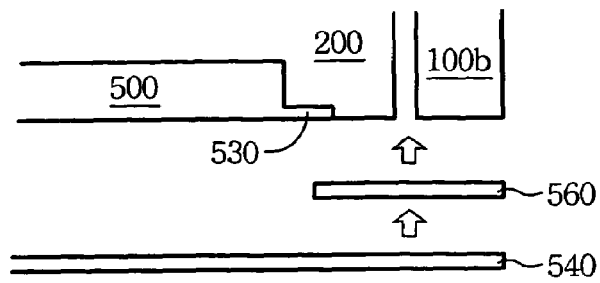
FIG. 4C depicts a schematic enlarged view of a lower surface of the PCB of FIG. 4A having a passivation film taped thereon by using a conductive tape with both surfaces gluey.

As a further simplification, as shown in FIG. 4C, a conductive tape 560 with both surfaces gluey is used instead of the conductive film 520 of FIG. 4A. One surface of the conductive tape 560 is taped on the grounding pin 530, the plastic frame 200, and the sidewalls of the metal cover 100b, while the other surface is used to glue a passivation film 540 on a lower surface of the PCB 500 as an electric shielding.

Figure 4D:
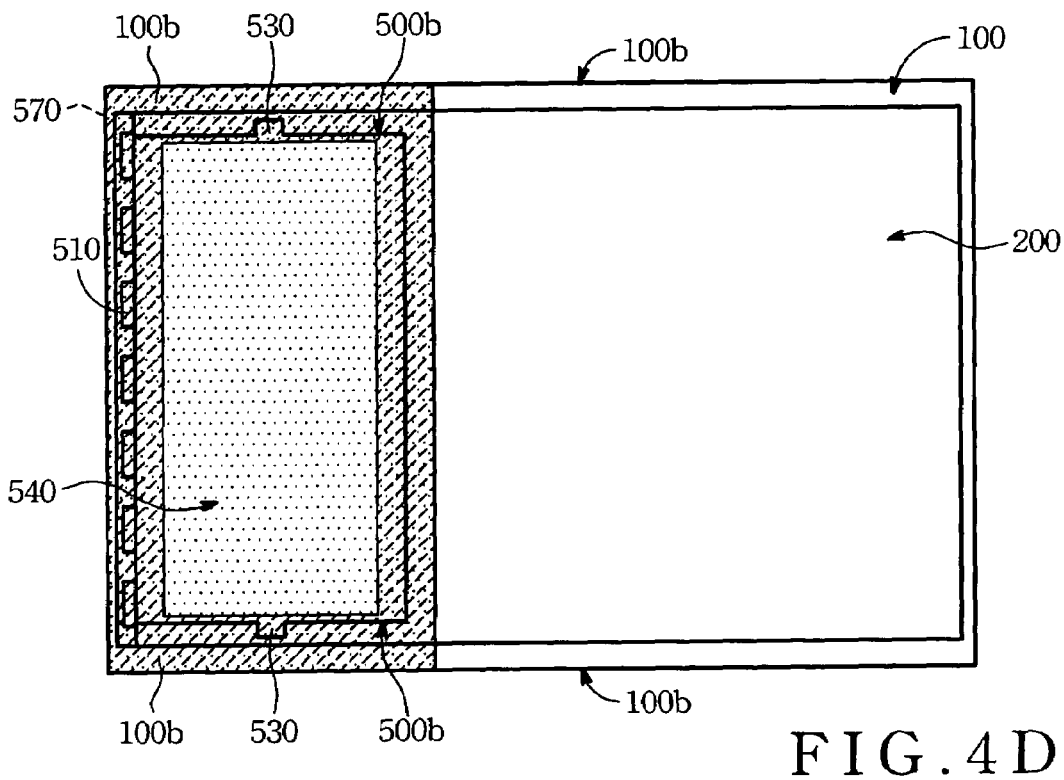
FIG. 4D depicts a schematic view of another embodiment of the LCD in accordance with the present invention, in which the a conductive tape with both surfaces gluey is taped to a lower surface of the PCB.

Furthermore, to ensure the passivation film 540 to be perfectly attached on the PCB 500 so as to achieve perfectly electric shielding event, as shown in FIG. 4D, the conductive tape 560 is taped around all four edges of the PCB 500 to form a larger attaching area and a better adhering effect upon the passivation film 540. It is noted that the surface area of the conductive tape 560 is still smaller than that of the PCB 500.

Figure 5:
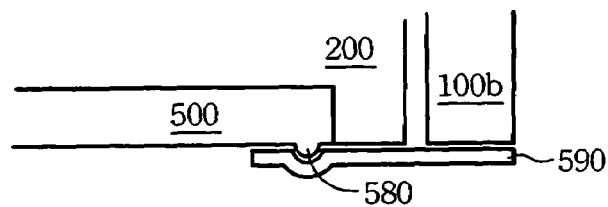
FIG. 5 depicts a schematic view of a third embodiment of the LCD in accordance with the present invention.

In the third embodiment of FIG. 5, a grounding pin 580 is fabricated right on the surface of the PCB 500 instead of extended from an edge of the PCB 500b of FIG. 4A. By attaching the grounding pin 580 with the conductive film 590, an electrical transmission path can be formed on the conductive film 590 between the grounding pin 580 and the metal cover 100. Obviously, the design of grounding pin 580 of FIG. 5 is simpler than that of FIG. 4A without degrading the grounding efficiency.

Figure 1:
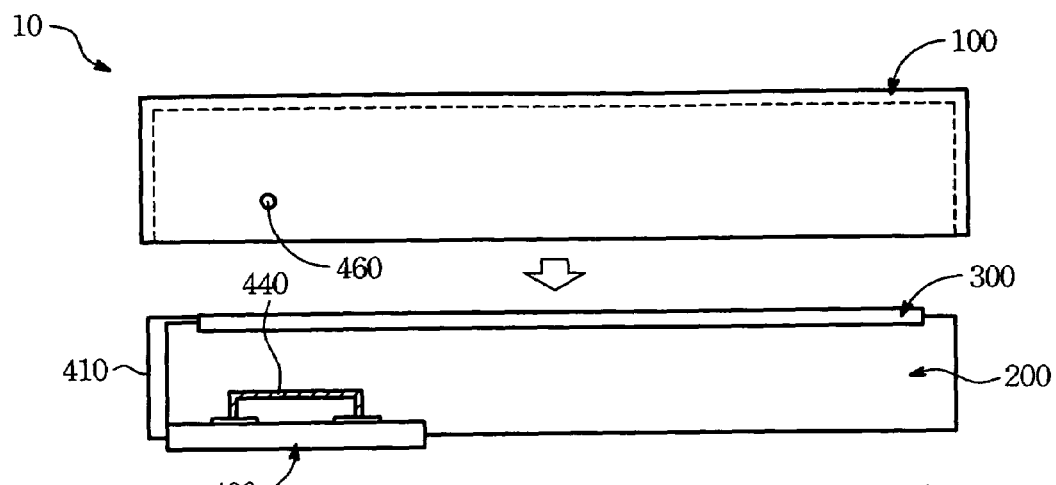
FIG. 1 depicts a schematic view of a PCB in a traditional LCD, in which the PCB is grounded by using a metal cover as a grounding inter-media.
Figure 2:
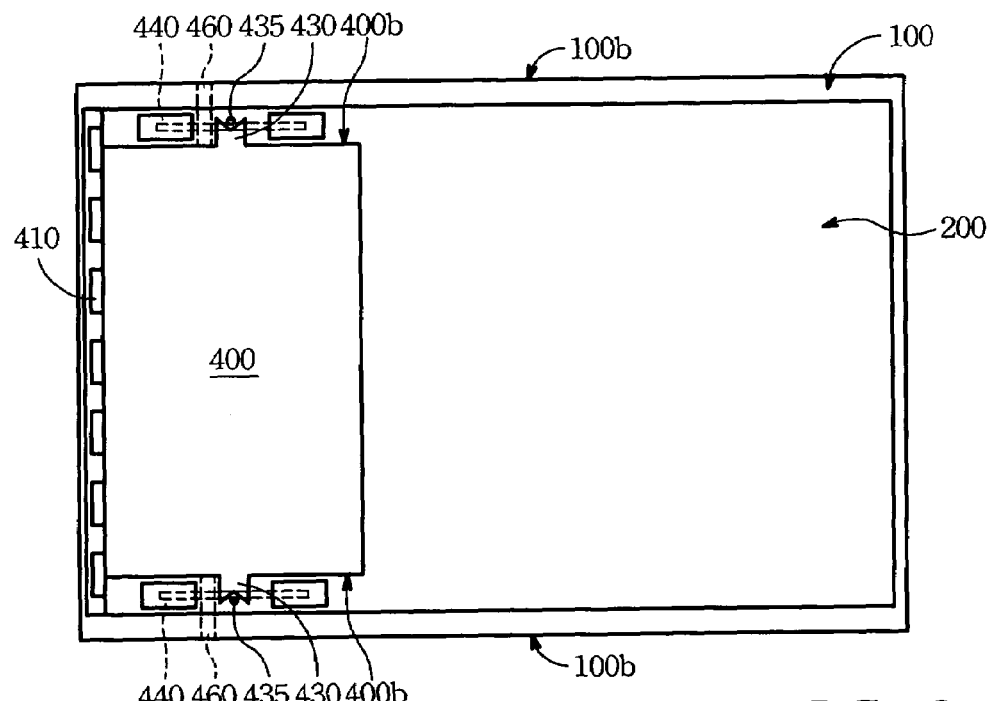
FIG. 2 depicts a bottom view of the LCD of FIG. 1.

By contrast to the grounding apparatus of FIG. 2, which shows that the PCB 400 is grounded by having the elastic conductive plate 440 fastened on the metal cover 100 with a screw. The grounding apparatus in the present invention has the following advantages:

1. The devices for grounding PCB 400 in the prior art, such as PCB screw 435, the elastic conductive plate 440, etc., are not required anymore in the grounding apparatus in accordance with the present invention. Therefore, the cost to assemble the LCD and the assembling time can be reduced.

2. As shown in FIG. 4A, a conductive film 520 is used instead of the grounding apparatus of FIG. 2, and the conductive film 520 is fixed by taping to form the electric transmission path for grounding the PCB 500. Therefore, the problem resulted from controlling the screw driving power of the grounding apparatus of FIG. 2 needs not to be concerned.

3. As shown in FIG. 4C, by using a conductive tape 560 with both surfaces gluey to form an electric transmission path for grounding the PCB 500, the passivation film 540 can be fixed on the PCB 500 in the same process. Therefore, the process to assemble the grounding apparatus is simplified.

4. In the third embodiment, the grounding pin 580 of FIG. 5 is fabricated right on the surface of the PCB 500 instead of the grounding pin 430 of FIG. 2 extended from an edge of the PCB 400b to reach the conductive elastic plate 440. It is clear that the fabrication process of the grounding pin 580 is simpler than that of the grounding pin 530.

With the example and explanations above, the features and spirits of the invention will be hopefully well described. Those skilled in the art will readily observe that numerous modifications and alterations of the device may be made when retaining the teaching of the invention. Accordingly, the above disclosure should be construed as limited only by the metes and bounds of the appended claims.

What is claimed is:

1. A liquid crystal display comprising:
a liquid crystal display panel;
a plastic frame, supporting said liquid crystal display panel;
a metal cover, boxing said plastic frame therein and forming an interior space to accommodate said liquid crystal display panel;
a print circuit board, fixed on a lower surface of said plastic frame and connecting to said liquid crystal display panel by a flexible flat cable extending along a sidewall of said plastic frame;

a passivation film, taped on a lower surface of said print circuit board as an electric shielding and extending further to cover the flexible flat cable; and a conductive film, formed on a grounding pin of said print circuit board and another sidewall of said metal cover for transmitting segregated charges on said print circuit board through said metal cover to environment.

2. The liquid crystal display of claim 1, wherein said conductive film is taped on the grounding pin and said metal cover by gluing.

3. The liquid crystal display of claim 1, wherein said conductive film is a conductive tape with both surfaces gluey, in which one surface of said conductive tape is taped on the grounding pin of said print circuit board and the sidewall of said metal cover and the other surface is used to glue the passivation film on a lower surface of said print circuit board to form an electric shielding upon devices on said print circuit board.

4. The liquid crystal display of claim 1, wherein said print circuit board connects to said liquid crystal display panel through the flexible flat cable and attends with connecting devices such as tape automated bounding (TAB), chip on glass (COG), or chip on film (COF).

5. The liquid crystal display of claim 1, wherein said two grounding pins are formed at opposite edges of said print circuit board without connecting flexible flat cables.

6. The liquid crystal display of claim 1, wherein the grounding pin is form on a lower surface of said print circuit board.

7. The liquid crystal display of claim 1, wherein the grounding pin extends from an edge of said print circuit board to the outside.

8. The liquid crystal display of claim 1, wherein said conductive film is taped around said print circuit board.

9. A print circuit board assembled in a liquid crystal display and utilized to control displaying signals, comprising:

a plurality of flexible flat cables, extending from an edge of the print circuit board to a liquid crystal display panel;

a grounding pin, formed on the print circuit board;

a passivation film, covering an exposed surface of the print circuit board as an electric shielding; and a conductive film, taped on both said grounding pin and a metal cover of the liquid crystal display to transport segregated charges on the print circuit board to environment, and taped along the edges of the print circuit board to fix said passivation film.

10. The print circuit board of claim 9, wherein said grounding pin is formed on an edge of the print circuit board without connecting flexible flat cables.

11. The print circuit board of claim 9, wherein said grounding pin is formed on the exposed surface of the print circuit board and close to an edge of the print circuit board.

12. The print circuit board of claim 9, wherein said grounding pin is extended from an edge of the print circuit board to outside the print circuit board.

13. The print circuit board of claim 9, wherein said conductive film is a conductive tape with both surfaces gluey, in which one surface of said conductive tape is taped on said grounding pin and sidewalls of the metal cover and the other surface is used to glue said passivation film on a lower surface of the print circuit board to form an electric shielding upon devices on the print circuit board.

14. The print circuit board of claim 9, wherein the print circuit board connects to the liquid crystal display panel through said flexible flat cable.

15. A liquid crystal display comprising:

a liquid crystal display panel;

a plastic frame, supporting said liquid crystal display panel;

a metal cover, boxing said plastic frame therein and forming an interior space to accommodate said liquid crystal display panel;

a print circuit board, fixed on a lower surface of said plastic frame and connecting to said liquid crystal display panel by a flexible flat cable extending along a sidewall of said plastic frame; and a conductive film, taped around said print circuit board and formed on a grounding pin of said print circuit board and another sidewall of said metal cover for transmitting segregated charges on said print circuit board through said metal cover to environment;

wherein a surface area of the conductive film being substantially smaller than that of the printed circuit board.

16. The liquid crystal display of claim 15, wherein said conductive film is taped on the grounding pin and said metal cover by gluing.

17. The liquid crystal display of claim 15, wherein said conductive film is a conductive tape with both surfaces gluey, in which one surface of said conductive tape is taped on the grounding pin of said print circuit board and the sidewall of said metal cover and the other surface is used to glue a passivation film on a lower surface of said print circuit board to form an electric shielding upon devices on said print circuit board.

18. The liquid crystal display of claim 15, wherein said two grounding pins are formed at opposite edges of said print circuit board without connecting flexible flat cables.

19. The liquid crystal display of claim 15, wherein the grounding pin is form on a lower surface of said print circuit board.

* * * * *